US010300479B2

(12) United States Patent
Gale et al.

(10) Patent No.: US 10,300,479 B2
(45) Date of Patent: May 28, 2019

(54) TIP OVERLAY FOR CONTINUOUS FLOW SPOTTING APPARATUS

(71) Applicant: Carterra, Inc., Salt Lake City, UT (US)

(72) Inventors: Bruce Kent Gale, Taylorsville, UT (US); Adam Miles, Salt Lake City, UT (US); Joshua Wayne Eckman, Salt Lake City, UT (US); Sriram Natarajan, Salt Lake City, UT (US); Jim Smith, Bountiful, UT (US); Mark Eddings, Salt Lake City, UT (US)

(73) Assignee: Carterra, Inc., Salt Lake City, UT (US)

( * ) Notice: Subject to any disclaimer, the term of this patent is extended or adjusted under 35 U.S.C. 154(b) by 0 days.

(21) Appl. No.: 15/617,182

(22) Filed: Jun. 8, 2017

(65) Prior Publication Data
US 2018/0001317 A1   Jan. 4, 2018

Related U.S. Application Data

(62) Division of application No. 12/487,962, filed on Jun. 19, 2009, now Pat. No. 9,682,372.
(Continued)

(51) Int. Cl.
*B01L 3/02* (2006.01)

(52) U.S. Cl.
CPC ... *B01L 3/0268* (2013.01); *B01J 2219/00385* (2013.01); *B01J 2219/00527* (2013.01);
(Continued)

(58) Field of Classification Search
CPC ......... B01L 2200/027; B01L 2200/021; B01L 2200/0636; B01L 3/02; B01L 3/52;
(Continued)

(56) References Cited

U.S. PATENT DOCUMENTS

| 4,978,507 A | 12/1990 | Levin |
| 5,641,640 A | 6/1997 | Hanning |

(Continued)

OTHER PUBLICATIONS http://www.merriam-webster/dictionary/spot.
(Continued)

*Primary Examiner* — Brian R Gordon
(74) *Attorney, Agent, or Firm* — Thorpe North & Western, LLP (57) ABSTRACT

The present disclosure provides apparatuses, systems, and methods involving a spotter apparatus for depositing a substance from a carrier fluid onto a deposition surface in an ordered array. The spotter apparatus includes a loading surface, including a first well and a second well, and a different outlet surface, including a first opening and a second opening, where a first microconduit fluidly couples the first well with the first opening and a second microconduit fluidly couples the second well with the second opening. An overlay is sealed to the outlet surface and penetrated by a deposition channel that is situated to communicate carrier fluid among the first opening, the second opening, and the deposition surface when the overlay is pressed against the deposition surface.

20 Claims, 4 Drawing Sheets

Related U.S. Application Data (60) Provisional application No. 61/132,586, filed on Jun. 19, 2008.

(52) U.S. Cl.
CPC ............ *B01J 2219/00596* (2013.01); *B01L 2300/0819* (2013.01); *B01L 2300/0829* (2013.01); *B01L 2300/0874* (2013.01); *B01L 2300/0887* (2013.01)

(58) Field of Classification Search
CPC ......... B01L 3/56; B01L 3/527; G01N 1/2813; G01N 2001/002
See application file for complete search history.

(56) References Cited

U.S. PATENT DOCUMENTS

| | | | |
|---|---|---|---|
| 5,965,456 A | 10/1999 | Malmqvist et al. | |
| 6,008,893 A | 12/1999 | Roos et al. | |
| 6,136,269 A | 10/2000 | Winkler et al. | |
| 6,207,381 B1 | 3/2001 | Larsson et al. | |
| 6,350,618 B1* | 2/2002 | Borrelli ............ | B01J 19/0046 422/507 |
| 6,485,690 B1* | 11/2002 | Pfost ................ | B01J 19/0046 422/552 |
| 6,493,097 B1 | 12/2002 | Ivarsson | |
| 6,589,798 B1 | 7/2003 | Lofas | |
| 6,714,303 B2 | 3/2004 | Ivarsson | |
| 6,722,395 B2 | 4/2004 | Overbeck et al. | |
| 6,762,061 B1* | 7/2004 | Borrelli ............ | B01J 19/0046 101/327 |
| 6,790,652 B1 | 9/2004 | Terry et al. | |
| 6,884,626 B1 | 4/2005 | Borrelli et al. | |
| 6,897,073 B2 | 5/2005 | Wagner et al. | |
| 6,999,175 B2 | 2/2006 | Ivarsson | |
| 7,015,043 B2 | 3/2006 | Roos et al. | |
| 7,025,935 B2* | 4/2006 | Jones ............... | B01L 3/0241 422/503 |
| 7,081,958 B2 | 7/2006 | Ivarsson | |
| 7,143,961 B1 | 12/2006 | Wu et al. | |
| 7,219,528 B2 | 5/2007 | Tidare et al. | |
| 7,262,866 B2 | 8/2007 | Ivarsson | |
| 7,320,879 B2 | 1/2008 | Karlsson et al. | |
| 7,322,535 B2 | 1/2008 | Erderly | |
| 7,373,255 B2 | 5/2008 | Karlsson et al. | |
| 8,210,119 B2 | 7/2012 | Gale et al. | |
| 8,211,382 B2 | 7/2012 | Myszka et al. | |
| 8,383,059 B2 | 2/2013 | Chang-Yen et al. | |
| 8,999,726 B2 | 4/2015 | Chang-Yen et al. | |
| 9,745,949 B2* | 8/2017 | Delamarche ...... | B01L 3/502707 |
| 2002/0164824 A1* | 11/2002 | Xiao ................ | B01J 19/0046 436/524 |
| 2002/0176805 A1 | 11/2002 | Han-Oh et al. | |
| 2003/0002962 A1 | 1/2003 | Atkinson et al. | |
| 2003/0073228 A1 | 4/2003 | Duffy et al. | |
| 2003/0124734 A1* | 7/2003 | Dannoux ............ | B01J 4/001 436/180 |
| 2004/0096984 A1 | 5/2004 | Elverd et al. | |
| 2005/0106621 A1 | 5/2005 | Winegarden et al. | |
| 2005/0180892 A1 | 8/2005 | Davies et al. | |
| 2005/0181510 A1 | 8/2005 | Schermer et al. | |
| 2006/0233673 A1* | 10/2006 | Beard ............... | B01L 3/5025 422/400 |
| 2011/0300034 A1 | 12/2011 | Mair et al. | |
| 2014/0171342 A1 | 6/2014 | Gale et al. | |
| 2015/0266021 A1 | 9/2015 | Eckman et al. | |
| 2015/0269312 A1 | 9/2015 | Miles et al. | |

OTHER PUBLICATIONS

Hatarajan et al., Continuous-flow microfluidic printing of proteins for array-based applications including surface plasmon resonance imaging, Analytical Biochemistry 373 (2008) 141-146.

Chang-Yen et al., A Novel PDMS Microfluidic Spotter for Fabrication of Protein Chips and Microarrays, Journal of Microelectromechanical Systems, vol. 15, No. 5, Oct. 2006, 1145-1151.

\* cited by examiner

TIP OVERLAY FOR CONTINUOUS FLOW SPOTTING APPARATUS

The present application is a divisional of U.S. patent application Ser. No. 12/487,962, filed on Jun. 19, 2009, now patented as U.S. Pat. No. 9,682,372, which claims the benefit of U.S. Provisional Patent Application No. 61/132,586, filed on Jun. 19, 2008, each of which is incorporated herein by reference.

BACKGROUND

The success of protein microarrays in drug discovery, diagnostics, and other biological applications has been hindered by the reliance on techniques that have been widely used in DNA microarrays. The transition to protein microarrays requires a different approach to array fabrication, as well as target immobilization and characterization. The development of effective and robust methods for protein micro-array immobilization is critical to the application of array technology. This is especially challenging with the wide variety of substrates that are used, such as gold, glass, or plastics. Immobilizing ligands in significant quantities, while retaining functionality and in a cost-effective and timely manner, is the primary objective of array technologies.

Pin printing, the most commonly method used for array fabrication, has an established infrastructure that includes robotics and microtiter plates, which make it an intriguing option for protein microarrays; however, pin printing devices are limited by a number of obstacles that are difficult and time consuming to overcome. The challenges include the optimization of a large number of parameters such as humidity, temperature, and surface energy while combating variable spot morphology caused by surface imperfections and over loading. Highly concentrated samples are often required to generate acceptable microarrays, which in the case of most proteins is inconvenient and cost prohibitive. A promising alternative approach to pin-spotting is the use of continuous flow microfluidics, which provides the ability to deliver ligand samples across a well-defined deposition zone.

The first continuous-flow microfluidic devices utilized for patterning surfaces with specific biomolecules and chemistries were developed for optical detection platforms such as SPR. More complex, arrayed independent microfluidic deposition devices followed later. The advantage of these 2-D microfluidic systems was isolated flow cells depositing biomolecules to specific miniature regions of the surface. Dense microarrays could be created for further use in bioassays by lifting the flow cell, rotating it 90°, and flowing the analyte solution back across the patterned lanes. However, such techniques still do not confine deposition to specific locations to minimize sample depletion as found in pin-printed arrays. As such, improvements to existing spotting techniques continue to be sought through ongoing research and development.

BRIEF DESCRIPTION OF THE DRAWINGS

Additional features and advantages of the disclosure will be apparent from the detailed description which follows, taken in conjunction with the accompanying drawings, which together illustrate, by way of example, features of the disclosure; and, wherein.

DETAILED DESCRIPTION

Before the present invention is disclosed and described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

In describing and claiming the present invention, the following terminology will be used in accordance with the definitions set forth below.

It is noted that, as used in this specification and the appended claims, the singular forms "a," "an," and "the" include plural referents unless the context clearly dictates otherwise. Thus, for example, reference to "a ligand" includes one or more of such ligands, and reference to "the substance" includes reference to one or more substance.

As used herein, the term "fluid" refers to any material that has the ability to flow, which can also be described as the ability to take the shape of its container, or does not resist deformation. This term includes liquids or gases. Also, a dispersion is considered a fluid herein, even though there are solids dispersed in a liquid. This term also includes non-Newtonian fluids, i.e. fluids with viscosities that change with an applied strain rate, and Newtonian fluids, i.e. fluids with viscosities that are nearly constant regardless of applied forces.

As used herein, the term "substantially" or "substantial" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking, the nearness of completion will be so as to have the same overall result as if absolute and total completion were obtained. The use of "substantially" is equally applicable when used in a negative connotation to refer to the complete or near complete lack of action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still contain such an item as long as there is no measurable effect thereof.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 micron to about 5 microns" should be interpreted to include not only the explicitly recited values of about 1 micron to about 5 microns, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

It has been recognized that a 3-D microfluidic spotting apparatus can confine deposition to specific locations on the substrate to minimize sample depletion and increase reaction zone density. The advantage of the 3-D configuration is the ability to tightly pack isolated deposition regions in an array format similar to a pin-printed array. However, unlike pin-printing, the sample is confined within the individual flow cells, which eliminates sample cross-over. In addition, the surface can be washed after deposition to eliminate spot spreading.

Figure 1A:
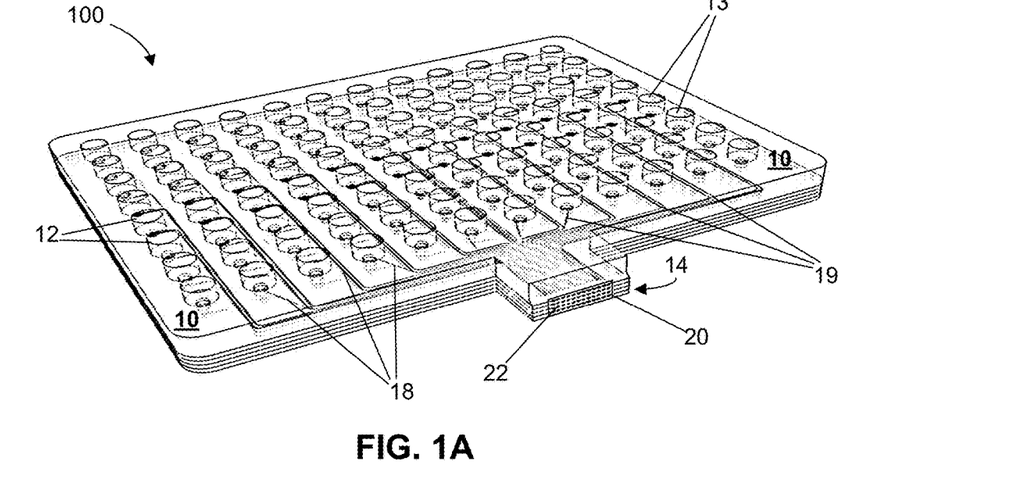
FIG. 1A is an illustration of a spotter apparatus in accordance with an embodiment of the present disclosure.

Multi-channel 3-D Continuous-Flow Microspotters (CFM; an exemplary embodiment of which is shown in FIG. 1A) demonstrated a dramatic increase in spot uniformity and quality when compared with standard pin-spotting techniques. As such, S. Natarajan, P. S. Katsamba, A. Miles, J. Eckman, G. A. Papalia, R. L. Rich, B. K. Gale, and D. G. Myszka, "Continuous-flow microfluidic printing of proteins for array-based applications including surface plasmon resonance imaging," Analytical Biochemistry 373 (2008) 141-146, and D. A. Chang-yen, D. Myzska, and B. K. Gale, "A Novel PDMS Microfluidic Spotter for Fabrication of Protein Chips and Microarrays," JMEMS 15 (2006) 1145-1151, are hereby incorporated by reference in their entireties.

Figure 1B:
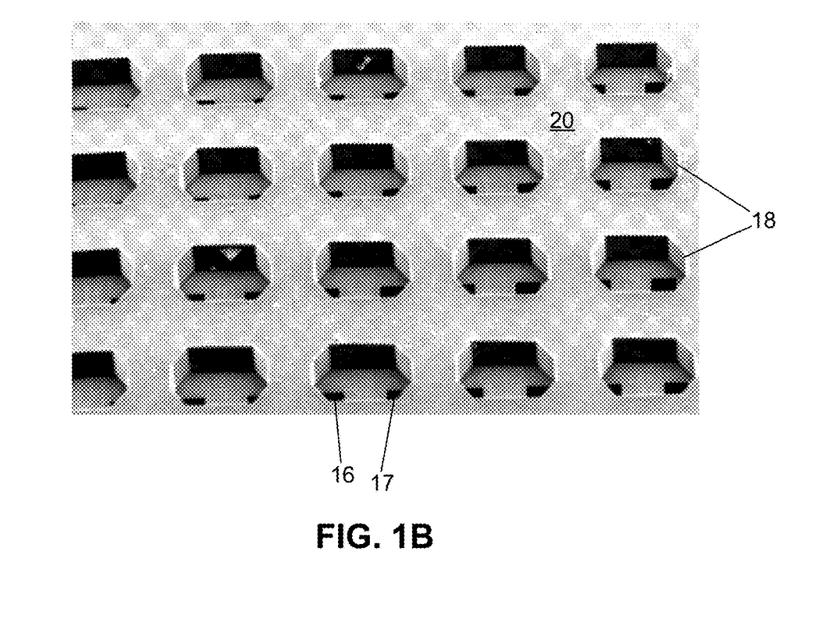
FIG. 1B is an illustration of an overlay having a plurality of deposition channels, each deposition channel having a first microconduit and second microconduit (inlet/outlet microchannels), in accordance with an embodiment of the present disclosure.

In one embodiment, the present CFM enables the deposition of dilute samples (<0.1 μg/ml) in the presence of high concentrations of contaminating protein. The ability to print proteins from crude sample eliminates the need for sophisticated separation and sample concentration. Additionally, the present disclosure provides improved CFM print head performance as it relates to spot-to-spot variation and the effect of contact time on spot quality and capture detection limits. Typically, Spot Coefficient of Variation (CV) values can from 10-40%, due primarily to irregular tip geometry introduced in the fabrication process. In the present disclosure, a method of adapting the CFM print head tip with a thin overlay, which enables custom design of the spot shape and the ability to address a single spot with multiple flow channels is provided. As shown in the electron micrograph image in FIG. 1B, an overlay can be formed and used that provides a uniform flow channel height across the entire array of reaction zones, leading to more consistent flow velocities and more uniform deposition.

Based on measurements using two different interaction systems (an antibody/antigen and biotinylated-carbohydrate/ligand system), the present disclosure provides a CFM that reduces ligand concentration requirements by >1,000 fold over standard pin spotting. Print heads adapted with overlays improved spot quality and repeatability, driving Coefficient of Variation (CV) values below 5% in one embodiment. The CFM's ability to print reproducible, functional spots from crude dilute samples can reduce sample requirements, eliminate sample preparation steps from complex media, and enhance confidence in the experimental repeatability for protein microarrays.

The present disclosure provides a new approach to improve manufacturing reproducibility of the CFM print head. To create controlled flow geometry across multiple (e.g., 4, 7, 8, 14, 16, 28, 48, 84, 88, 96, 192, 360, 368, 384, 768, 1488, 1504, or 1536) reaction zones, a thin layer can be successfully bonded on the tip over the paired openings (reversible inlets and outlets) creating a multiple-channel flow cell array. The thin layer can be made from polydimethylsiloxane (PDMS), which can also be the same material as the CFM; however, it could also be made from any material that would facilitate sealing at a sensor surface. The overlay can permit different spot shapes, such as circles, squares, ovals, hexagons, octagons, etc., to be created. More importantly, it can form an easily controllable and uniform flow channel height across the entire array of reaction zones, generating consistent flow velocities that lead to more consistent deposition between spots.

Using two different Flexchip surface chemistries (protein A/G and neutravidin), the present disclosure exemplifies that the CFM can produce consistent densities of spotted material with CV less than 5%. Flow rate tests, demonstrated below, show that the mass transport effects are not a significant limitation in the present CFM design since flow rates above 10 uL/min did not significantly improve deposition.

The present disclosure further illustrates the advantages of extending the contact time for antibody capture. By oscillating the flow, the present CFM can expose a sample to the surface for as long a period as desired. This makes it possible to capture antibody samples, for example, from dilute solutions. Using Protein A/G capture, the present disclosure provides significant levels of capture even at antibody concentrations as low as 100 ng/ml. Based on the present results, it is likely that by using at least an hour, two hour, or three hour capture time, it is possible to capture and detect antibodies at very low concentrations, e.g., as low as 1 ng/ml. Capturing can be a particularly useful application of the CFM technology for antibody screening and characterization.

As a high-throughput printing tool, the CFM has the potential to print microarrays in the area of 500-1000 spots per day (depending on the printing time and the number of well systems of the array); however, as the CFM can be scaled by shrinking spot size and stacking fluidic layers, higher throughput is possible. Additionally, the CFM printing system can be fully automated.

An exemplary spotter apparatus 100 for depositing a substance from a carrier fluid onto a deposition surface in an array is illustrated in FIG. 1A. The illustrated embodiment actually shows a multi-well arrangement in which the basic format of the apparatus is repeated a number of times. The format of the apparatus can comprise a loading surface 10 including a first well 12 and a second well 13; and an outlet surface 14, which is different than the loading surface, and includes a first opening 16 and a second opening 17. Fluid is communicated between these surfaces via microconduits. For example, a first microconduit 18 can fluidly couple the first well with the first opening and a second microconduit 19 can fluidly couple the second well with the second opening. An overlay 20 can be sealed to the outlet surface. The overlay is penetrated by a deposition channel 22 that is situated to communicate carrier fluid among the first opening, the second opening, and a deposition surface when the overlay is pressed against the deposition surface.

As discussed above and shown in FIG. 1A, the basic spotter structure can be repeated in a spotter apparatus so that there are a plurality of first wells, a plurality of second wells, a plurality of first microconduits, a plurality of second microconduits, a plurality of first openings, a plurality of second openings, and a plurality of deposition channels forming an ordered array. The number of the plurality of deposition wells can be 8, 16, 32, 96, 192, 384, 768, or 1536 (first and second) wells. Also, the number of the plurality of deposition channels can be 4, 7, 8, 14, 16, 28, 48, 84, 88, 96, 192, 360, 368, 384, 768, 1488, 1504, or 1536 outlets. These are exemplary only, as other numbers of wells and/or deposition channels can be present. Typically, a pair of wells (first and second) is matched with a single deposition channel, though this is not required.

Generally, the spotter apparatus can have an outlet surface that is a side or a bottom surface of the spotter apparatus relative to the loading surface. Also, the outlet surface can be substantially orthogonal to the loading surface. The plurality of deposition channels can be arranged in a 2-D array. Additionally, the microconduits can have a diameter from about 5 µm to about 500 µm. Also, the microconduits can be of varying lengths. The wells can have a volume of about 0.5 mm$^3$ to about 500 mm$^3$. When the overlay is pressed against the deposition surface the chamber defined by the surface and each deposition channel can have a volume of about 0.1 nL to 500 nL. This range is exemplary only, as much larger or even small volume deposition channels can be used in accordance with embodiments of the present disclosure. In one embodiment, the deposition channels can include or be adjacent to at least one sensing component.

The outlet surface and overlay can be configured to form a seal or connection with the deposition surface when pressed against the surface. When so sealed, each deposition channel provides a fluidtight chamber in which the carrier fluid can flow from the first microconduit to the second microconduit, and vice versa. As discussed above, the overlay can be so configured as to provide substantially uniform flow chamber height across all of its deposition channels of the array. Such a configuration is realized by a uniform depth exhibited across the deposition channels. This can result in uniform flow velocity of the carrier fluid across flow chambers, and consequently uniform contact time and consistent deposition density.

It is noted that the overlay can be separate from the deposition surface, and the overlay and the deposition surface can be configured to form a seal around the deposition channel when pressed together, as set forth above. However, in another embodiment, the deposition surface can be integrated with the overlay. In still another embodiment, the deposition surface can also be sensing surface that is configured to sense the at least one substance, or an interaction of multiple substances after being deposited thereon.

As discussed above, the deposition channels can have a geometric shape selected from the group consisting of polygon, circular, elliptical, and combinations thereof. As such, the shapes can include triangular, rectangular, circular, hexagonal, octagonal, etc. In one embodiment, the shape can be a hexagon.

The spotter apparatus and/or the overlay can be independently manufactured from a material selected from the group of silicon, silica, gallium arsenide, glass, ceramics, quartz, neoprene, polytetrafluoroethylene polymers, perfluoroalkoxy polymers, fluorinated ethylene propylene polymers, tetrafluoroethylene copolymers, polyethylene elastomers, polybutadiene/SBR, nitriles, and combinations thereof. In one embodiment, polydimethylsiloxane (PDMS) can be used, and in another embodiment, thermoplastic elastomer can be used.

Additionally, the device can also be part of a larger system that comprises the spotter apparatus can further comprise a pumping manifold that interfaces with at least some of the plurality of deposition wells. In one embodiment, the pumping manifold can interface with a half of the deposition wells. Also, a pump/vacuum device can be connected to a pumping manifold that is attached to the loading surface of the spotting apparatus. This or other system can be used to drive the fluid back and forth between the first and second wells. In another embodiment, the system can further comprise well plate handling equipment to load and unload the spotter apparatus.

A method of depositing at least one substance from a carrier fluid on a deposition surface can comprise loading at least a portion of a plurality of deposition wells of a spotter apparatus as described above, with the carrier fluid having at least one substance; and flowing the carrier fluid from the first well, through the first microconduit, the deposition channel, and the second microconduit, respectively, and into the second well. The deposition channel directs at least one substance from the carrier fluid onto the deposition surface. Deposition can be continued or enhanced by reversing the flow of carrier fluid one or more times. Additionally, the deposition surface can further comprise a probe attached thereto. In one embodiment, the method can further comprise a step of pressing the overlay against the deposition surface prior to flowing the carrier fluid. In another embodiment, the deposition surface can be integrated with the overlay. Additionally, it is also noted that the deposition surface can also be also a sensing surface that is configured to sense the at least one substance or an interaction of multiple substances deposited thereon. This can be done by directly sensing the material while the deposition surface is intact against the overlay, or after separating the deposition surface from the overlay.

In one embodiment, loading the plurality of deposition wells can comprise loading at least two deposition wells with a different substance. In another embodiment, the method can further comprise flowing a second substance over the deposition surface without breaking the seal between the overlay and the surface, e.g., flow a first substance over a deposition surface spot, and then flow a second substance over the same deposition spot. This may cause a reaction or other interaction that is the purpose of the spotting activity. Often, the first fluid with the first substance can be removed before the second fluid with the second substance is flowed onto the same deposition spot. Alternatively, removal of the first fluid may not be required, but rather, the second fluid can be added to the first fluid, e.g., in the opposite well.

The substance or substances can be a protein; a nucleic acid, a cell; a lectin; a synthetic composite macromolecule; functionalized nanostructure; a synthetic polymer; a nucleotides, a nucleoside; an amino acids; a ligand; a chelator; a hapten; a chemical compounds; a sugar; a lipid; a liposome; a tissue sample; a virus; and any combinations thereof.

The method can be used to conduct surface plasmon resonance, enzyme-linked immunosorbent assays, chemiluminescence tests, fluorescence tests, or a quartz crystal microbalance. Additionally, the present disclosure can be used with ink jet printers, mass spectrometry systems, spotting robots, and sample injection systems.

A method of loading a spotter apparatus for depositing a substance from a sample fluid onto a deposition surface can comprise positioning the spotter apparatus on the deposition surface; and loading the sample fluid into a plurality of wells of the spotter apparatus. Additionally, the present disclosure can provide automated systems using well plate handling equipment.

EXAMPLES

While the forgoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the disclosure. Accordingly, it is not intended that the invention be limited, except as by the claims set forth below.

Materials Used

A Standard 48-channel CFM print head and flow system was obtained from Wasatch Microfluidics (Salt Lake City, Utah). A Flexchip instrument, as well as Protein A/G and neutravidin sensor chips, was obtained from GE HealthCare (Uppsala, Sweden). Mouse anti-IL2 mAb (AHC0722), was obtained from Biosource (Invitrogen). Interleukin-2 (IL2) was provided by Tom Ciardelli at Hanover Outdoors (Hanover, N.H.). Biotinylated-, Ricinus Communis Agglutinin (Bt-RCA 120) and the analyte Asialofetuin (ASF) were provided by (John Innes Center, England). Scrubber 2 was from Biologic Software Pty. Ltd. (Campbell, Australia). The Qarray mini pin arrayer with 200-µm pins was from Genetix (Hampshire, UK).

Example 1—CFM Print Head Tip Overlay Fabrication

A standard CFM print head was manufactured by the process set forth in D. A. Chang-yen, D. Myzska, and B. K. Gale, A Novel PDMS Microfluidic Spotter for Fabrication of Protein Chips and Microarrays, JMEMS 15 (2006) 1145-1151, which has been incorporated by reference. Tip overlay designs were fabricated using the same micro-fabrication techniques. The Standard 48-channel CFM print heads were cut back using a razor blade ensuring that each flow circuit terminates in a separate inlet or outlet with an approximate size of 150×150 µm. A pattern was designed to create an array of 48 extended hexagonal flow cells that would fit over the terminating inlet and outlet channels. The overlay features accounted for post-cure PDMS (polydimethylsiloxane) shrinkage to facilitate accurate alignment to the CFM print head tip. A photomask was generated using an Electromask MM250 Criss Cross pattern generator. SU-8 photoresist was spun to a thickness of 100 µm and patterned using a Suss/Microtech MA 1006. After development and post bake processing, the tip overlay SU-8 features were coated with fluorosilanizing agent (tridecafluoro-1,1,2,2-tetrahydrooctyl) triethoxysilane (Gelest Inc., Philadelphia, Pa.) to facilitate PDMS release from the mold. PDMS (Sylgard™ 184, Dow Corning, Midland, Mich.) was mixed at a ratio of 10:1 and degassed for 1 hour. PDMS was then placed in the mold and cured at 90° C. for one hour.

Figure 2A:
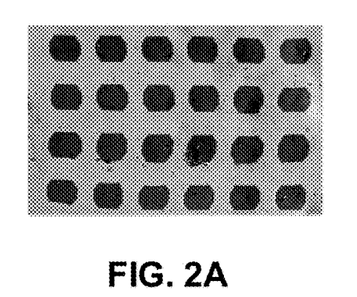
FIG. 2A is a flexchip wet chip image of anti-IL2 spots deposited using the modified CFM print head, showing 24 of the 48 deposited regions, in accordance with an embodiment of the present disclosure.
Figure 2B:
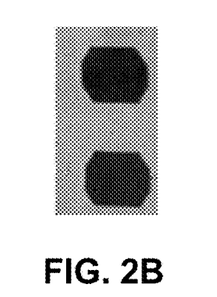
FIG. 2B is an expanded view of two deposition spots from FIG. 2A, in accordance with an embodiment of the present disclosure.

The overlay was then removed and placed on the CFM print head tip. The CFM print head tip was cut back 4-5 mm past the reaction zones to reveal 96 flow channels (48 inlets and 48 outlets) terminating at a smooth, flat surface. To create the controlled flow geometry across 48 reaction zones, a hexagonal overlay was successfully bonded on the tip over the openings (reversible inlets and outlets) to create a 48-channel flow cell array (see FIG. 1B). Further demonstrating the success of the print head overlay, a wet chip image from a Flexchip instrument of anti-IL2 spotted on a protein A/G chip is shown in FIG. 2. The image shows the spots match the geometry of the tip overlay. In addition, the spots are uniform throughout the printed area and show no spreading which is commonly observed for pin spotting.

Example 2—CFM Printing

Protein printing studies were done on protein A/G- and neutravidin-coated Flexchip slide, which are 1 inch×3 inch gold-coated slides. The slide has an 11 mm×11 mm active sensor region. The current CFM print head can print twice in the sensor region for a total of 96 spots per slide. A CFM flow system performed the microfluidic control through the CFM print head. The print head is placed in the instrument, where it is aligned to the Flexchip sensor region and compressed to close the fluidic circuit. A manifold linked to a peristaltic pump was placed above the print head to seal around the inlets and outlets on top of the print head. Pressure or vacuum was applied to the manifold to recirculate sample across the Flexchip surface through the 48 fluidic circuits. The flow direction was cycled back and forth through the duration of each run. Finally, a wash solution of phosphate-buffered saline (PBS) was loaded into each well and flushed through the channels to clear any residual protein solution.

Example 3—Anti-IL2 Printing

Typical Anti-IL2 mAb printing experiments utilized between 50 to 100 µl of sample per spot. Stock anti-IL2 mAb was diluted using PBS with 0.005% Tween-20 and 0.1 mg/ml BSA for all of the experiments. Reproducibility and flow rate studies were performed by oscillating an anti-IL2 solution at 10 µg/ml concentrations. A five-fold dilution series from 20 µg/ml was used for the pin-spotting comparison and the contact time experiments. Spotting times varied from 10-30 minutes for CV, pin-vs. fluidic spotting comparison, and flow rate experiments. Contact time experiments varied from 1.4 to 180 minutes. A flow rate of 60 µl/min was used in all experiments except for the flow rate study, which varied the flow rates from stop flow to 180 µl/min. Identical samples were pin printed using 200-µm tipped pins. The sample dip and print time were 500 ms and 200 ms, respectively. Pin printing was done with 80% humidity in the printing chamber. The pins were washed with 0.5% SDS, rinsed with water, and blown dry between each printing.

After completion of CFM printing on the Flexchip slide, the slide was removed from the CFM instrument and immediately prepared for analyte binding. A flow cell gasket and a cover window were affixed over the printed region on the slide; then, the assembled chip was docked into the Flexchip instrument. The chip was filled with running buffer (PBS supplemented with 0.005% Tween-20 and 0.1 mg/ml BSA). The chip was then imaged using the Flexchip optics and the regions of interest (protein spots and interstitial reference positions) were defined within the software. IL2 having a concentration of 24 nM was injected at a flow rate of 300 µl/min for eight minutes, followed by an eight-minute dissociation phase in which the surface was washed with running buffer. The binding experiments were performed at 25° C. The Flexchip response data were exported from the instrument software and analyzed using Scrubber 2 (Biologic Software Pty. Ltd., Australia).

Example 4—Biotinylated RCA Printing

Bt-RCA-120 was captured onto a neutravidin surface using pin spotting and the fluidic spotter. The highest concentration of BT-RCA-120 was 100 nM and it was spotted in a two-fold dilution series with 24 concentrations in total. Each concentration was spotted twice by both methods. The fluidic spotter used a sample volume of 70 µl, which was passed back and forth over the sensor surface for 1 hour. Identical Bt-RCA-120 samples were pin printed as described above for anti-IL2.

After completion of CFM printing on the Flexchip slide, the slide was removed from the CFM instrument and immediately prepared for analyte binding. A flow cell gasket and a cover window were affixed over the printed region on the slide; then, the assembled chip was docked into the Flexchip instrument. The chip was filled with running buffer (PBS supplemented with 0.005% Tween-20 and 0.1 mg/ml BSA). The chip was then imaged using the Flexchip optics and the regions of interest (protein spots and interstitial reference positions) were defined within the software. ASF at 100 µg/ml was injected at a flow rate of 300 µl/min for eight minutes, followed by an eight-minute dissociation phase in which the surface was washed with running buffer. The binding experiments were performed at 25° C. The Flexchip response data were exported from the instrument software and analyzed using Scrubber 2 (Biologic Software Pty. Ltd., Australia).

Example 5—CFM Print Performance

Figure 3:
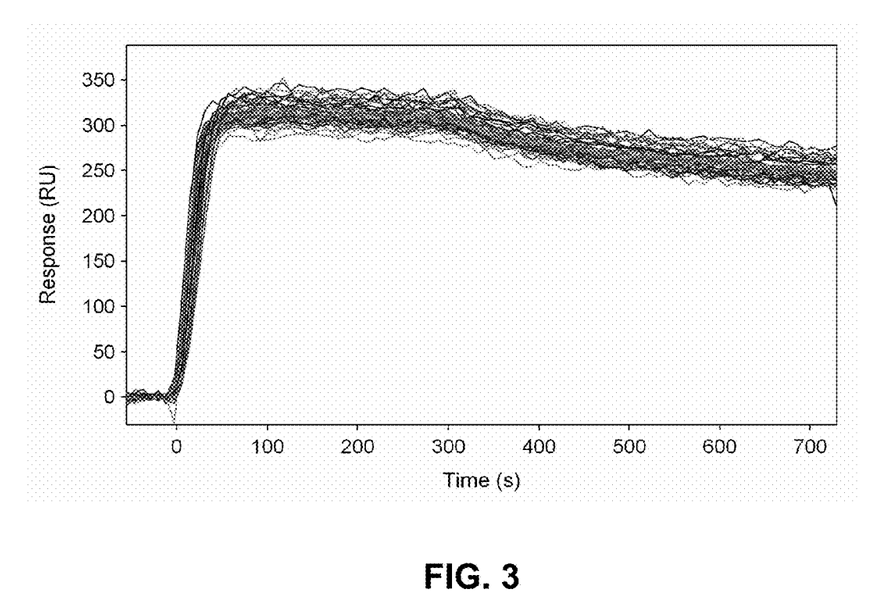
FIG. 3 is an SPR sensorgram graphed as response vs. time of the anti-IL2/IL2 binding reaction at 48 spotted regions on a Protein A/G Flexchip substrate, in accordance with an embodiment of the present disclosure.

The spot-to-spot variability for all 48 spots was explored using the same flow rate, concentration, and contact time conditions. Anti-IL2 antibody was deposited on a protein A/G-coated Flexchip slide. After printing was completed, the chip, assembled from the slide, gasket, and coverslip, was installed into the Flexchip instrument. The chip was washed for 30 minutes with PBS running buffer containing 0.005% Tween-20 and 0.1 mg/ml BSA. Interleukin-2 (IL2) was then injected at a concentration of 24 nM for 5 minutes followed by a 7 minute dissociation phase. Flexchip-derived sensorgrams of the IL2 binding results are shown in FIG. 3. The standard deviation in the maximum response across all 48 spots of anti-IL2 mAb was less than 4%.

Example 6—Pin Printing Vs. Flow Spotting Comparison with Anti-IL2

Generally, CFM print heads can outperform pin-spotting by enabling the creation of spots at more dilute, as well as at higher, concentrations than are possible with pin-spotting. In order to determine the performance of the adapted CFM print head, a comparison study with pin spotting was run on protein A/G and neutravidin Flexchip substrates. In each case the pin-spotting and CFM printing were done on the same chip to reduce potential variability on the Flexchip substrate surface.

Figure 4A:
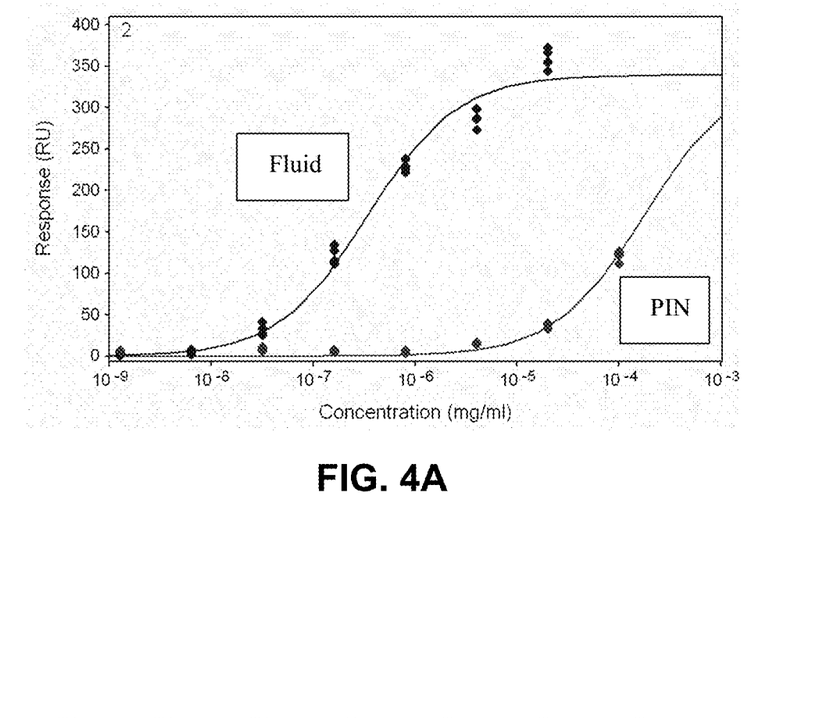
FIG. 4A shows the response values for IL2 plotted vs. the spotting concentration of the anti-IL2 mAb, for spin and fluidic spotting, in accordance with an embodiment of the present disclosure.

Anti-IL2 was pin- and fluidic-spotted onto a Protein A/G chip in a five-fold concentration series. Eight anti-IL2 concentrations were spotted four times each and IL2 was injected as described above. FIG. 4A shows the response values for IL2 plotted vs. the spotting concentration of the anti-IL2 mAb. Detection of IL2 binding using pin spotting required the concentration of the anti-IL2 mAb to be >10 ug/ml. In contrast, the CFM spotter was capable of achieving significant signals with >1000 fold less concentrated samples of anti-IL2. Even with this short deposition time of 15 minutes, it was possible to use anti-IL2 concentrations as low as 100 ng/ml. The coefficient of variation for the binding responses from the replicated spots averaged ~5%.

Example 7—Pin Printing Vs. Flow Spotting Comparison with Bt-RCA

Figure 4B:
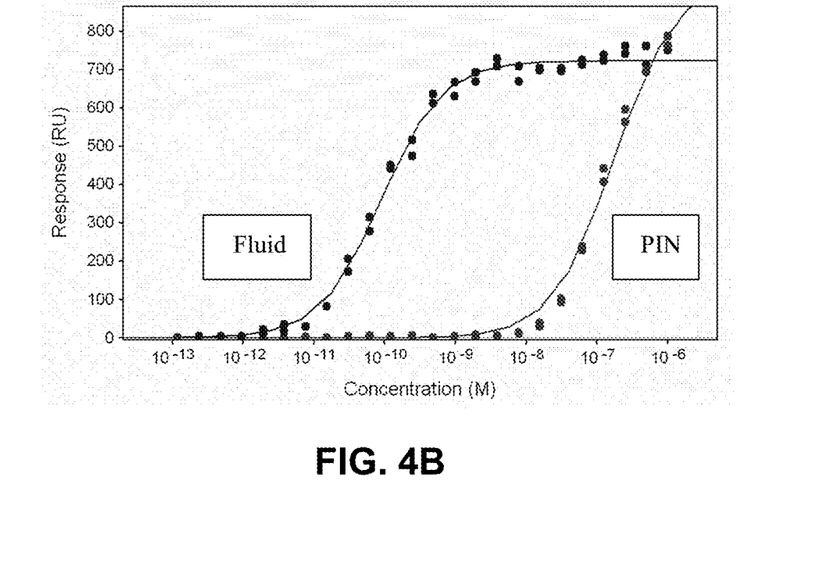
FIG. 4B shows saturating binding response for ASF plotted vs. the spotting concentration of biotinylated-RCA, by pin and fluidic spotting, in accordance with an embodiment of the present disclosure.

To probe the benefits of the CFM system further, a biotinylated-lectin, RCA, was spotted with pin and CFM spotting methods on a neutravidin Flexchip surface in a two-fold dilution series using 1 uM as the highest concentration. Each of the 24 different concentrations were spotted twice using identical solutions for both methods and ASF, an analyte that recognizes the sugars on the biotinylated RCA ligand, was injected across the chip surface. The saturating binding response for ASF from each spot was then plotted vs. the spotting concentration of biotinylated-RCA (FIG. 4B). As was observed for the anti-IL2 spotting, these results demonstrate that the CFM is capable of spotting the biotinylated ligand at >1000 fold more dilute conditions than that with pin spotting. The standard errors in both spotting conditions were less than 5% across the entire concentration range. Importantly, the CFM spotter shows saturation of the neutravidin surface at concentrations as low as 1 nM of the biotinylated ligand. In contrast, a concentration of >20 nM is needed to even detect initial deposition using pin spotting.

Example 8—Flow Rate Study

Figure 5:
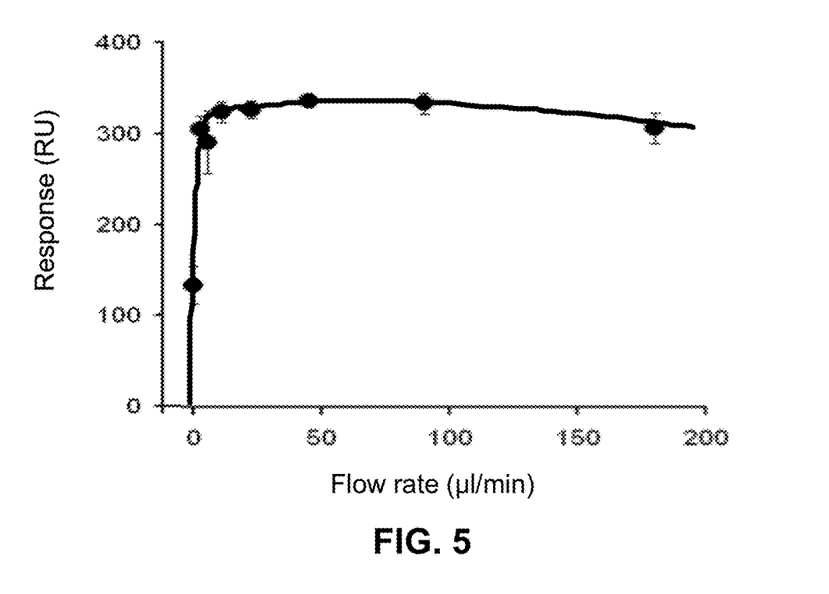
FIG. 5 shows the amount of anti-IL2 deposited based on the binding level of IL2 antigen at the different flow rates (Anti-IL2 mAb was exposed to the protein A/G chip surface at a concentration of 10 ug/ml for ten minutes using flow rates of 180, 90, 45, 22.5, 11.25, 5.6, 2.5, and 0 ul/min, with each data point representing the average of the response values collected from four separate channels)

Another factor affecting the deposition of biomolecules within flow cell systems is flow rate. In order to assess the efficiency of the new CFM, a flow rate study was performed: fixing the concentration and contact time of anti-IL2 mAb while varying the flow rate from stopped flow to 180 μl/min. (In the stopped-flow scenario, the sample was flowed into the reaction area and stopped to allow strictly diffusion-initiated deposition.) FIG. 5 shows the amount of anti-IL2 deposited based on the binding level of IL2 antigen at the different flow rates. These data demonstrate that saturating responses were achieved once the flow rate exceeded 10 ul/min and no additional deposition was achieved at faster flow rates.

Example 9—Contact Time Study

Figure 6:
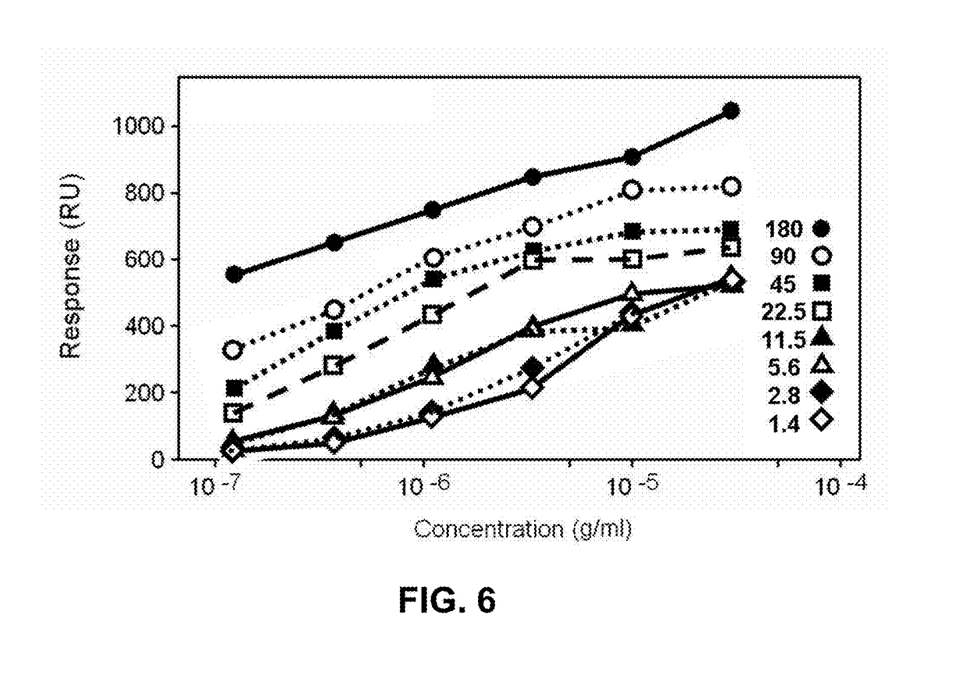
FIG. 6 shows the responses for IL2 binding plotted versus concentrations and contact time, in accordance with an embodiment of the present disclosure.

A significant advantage of the CFM print head is that it is possible to expose a sample to the substrate surface for extended periods of time by oscillating the flow. To demonstrate the benefits of extended contact time, anti-IL2 mAb was spotted from a high concentration of 20 ug/ml down to 100 ng/ml using a two-fold concentration series. Each of the six different concentrations was spotted from 1.4 minute up to 3 hours. FIG. 6 shows the responses for IL2 binding plotted versus concentrations and contact time. As expected, the longer contact times lead to greater deposition of anti-IL2 onto the protein A/G surface. These results demonstrate that relatively short contact times (one to five minutes) may be used when the mAb concentration is 10 ug/ml or higher and that, by extending the contact time, it is be possible to capture antibodies onto a protein A/G surface with concentrations are even less than 100 ng/ml.

While the present disclosure has been described above with particularity and detail in connection with what is presently deemed to be the most practical embodiments of the disclosure, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A method of depositing at least one substance from a carrier fluid on a deposition surface, the method comprising:
   a) loading a carrier fluid having at least one substance into a first well of a spotter apparatus, wherein the spotter apparatus comprises:
      i) a loading surface including the first well and a second well;
      ii) an outlet surface, different than the loading surface, including a first opening and a second opening;
      iii) a first microconduit fluidly coupling the first well with the first opening;
      iv) a second microconduit fluidly coupling the second well with the second opening; and
      v) an overlay positioned on the outlet surface, wherein the overlay comprises a deposition channel that fully penetrates through the overlay, wherein the deposition channel is situated to communicate carrier fluid among the first opening, the second opening, and a deposition surface when the overlay is pressed against the deposition surface,
   b) pressing the overlay against the deposition surface to form a seal between the overlay and deposition surface, and
   c) flowing the carrier fluid in series from the first well, through the first microconduit to the deposition channel, through the second microconduit and into the second well, wherein the deposition channel directs at least one substance from the carrier fluid onto the deposition surface.

2. The method of claim 1, further comprising flowing the carrier fluid from the second well, through the second microconduit to the deposition channel, then through the first microconduit, and into the first well.

3. The method of claim 1, wherein the spotter apparatus further comprises additional wells, microconduits, and deposition channels forming an array of multiple deposition channels, wherein individual deposition channels are connected to their own unique first well, second well, first microconduit, second microconduit, first opening, and second opening, each arranged as set forth in i)-v), and wherein flowing the carrier fluid comprises flowing multiple carrier fluids through the multiple deposition channels, thereby forming an array of multiple deposition spots on the deposition surface.

4. The method of claim 3, wherein the loading step comprises loading at least two different carrier fluids into separate unique first wells.

5. The method of claim 3, wherein the spotter apparatus includes 8, 16, 32, 96, 192, 384, 768, or 1536 deposition channels connected to first and second wells, first and second microconduits, and first and second openings.

6. The method of claim 3, wherein the spotter apparatus includes 4, 7, 8, 14, 16, 28, 48, 84, 88, 96, 192, 360, 368, 384, 768, 1488, 1504, or 1536 deposition channels connected to first and second wells, first and second microconduits, and first and second openings.

7. The method of claim 1, wherein the deposition channel when pressed against the deposition surface encompasses an area of the deposition surface having a geometric shape selected from the group consisting of triangular, rectangular, circular, hexagonal, octagonal, circular, and elliptical.

8. The method of claim 1, further comprising, after flowing the carrier fluid, flowing a second carrier fluid having a second substance through the deposition channel over the deposition surface without breaking the seal between the overlay and the deposition surface.

9. The method of claim 1, wherein the loading surface and the outlet surface are formed of a material selected from the group consisting of silicon, silica, polydimethylsiloxane (PDMS), gallium arsenide, glass, ceramics, quartz, neoprene, polytetrafluoroethlene polymers, perfluoroalkoxy polymers, fluorinated ethylene propylene polymers, tetrafluoroethylene copolymers, polyethylene elastomers, polybutadiene/SBR, nitriles, and combinations thereof.

10. The method of claim 1, wherein the loading surface and the outlet surface are formed of polydimethylsiloxane or thermoplastic elastomer.

11. The method of claim 1, wherein the overlay is formed of a material selected from the group consisting of silicon, silica, polydimethylsiloxane (PDMS), gallium arsenide, glass, ceramics, quartz, neoprene, polytetrafluoroethylene polymers, perfluoroalkoxy polymers, fluorinated ethylene propylene polymers, tetrafluoroethylene copolymers, polyethylene elastomers, polybutadiene/SBR, nitriles, and combinations thereof.

12. The method of claim 1, wherein the overlay is formed of polydimethylsiloxane or thermoplastic elastomer.

13. The method of claim 1, wherein when the overlay is pressed against the deposition surface, the deposition channel, the outlet surface, and the deposition surface define a chamber having a volume of from about 0.1 nL to 500 nL.

14. The method of claim 1, wherein the deposition surface is integrated with the overlay.

15. The method of claim 1, wherein the outlet surface is integrated with the overlay.

16. The method of claim 1, wherein the overlay is not integrated with the deposition surface or the outlet surface.

17. The method of claim 1, wherein the deposition surface is also a sensing surface that is configured to sense the at least one substance or an interaction of multiple substances.

18. The method of claim 1, wherein the loading surface, the outlet surface, the first microconduit, and the second microconduit are formed in multiple layers that are substantially parallel to the loading surface.

19. The method of claim 18, wherein the overlay is orthogonal to the multiple layers.

20. The method of claim 3, wherein the array of multiple deposition spots is a 2-D array.

* * * * *